(12) United States Patent
Turki (10) Patent No.: US 9,584,040 B2
(45) Date of Patent: Feb. 28, 2017

(54) DOUBLE-RECTIFIER FOR A MULTI-PHASE CONTACTLESS ENERGY TRANSMISSION SYSTEM

(71) Applicant: Bombardier Transportation GmbH, Berlin (DE)

(72) Inventor: Faical Turki, Bergkamen (DE)

(73) Assignee: Bombardier Transportation GmbH, Berlin (DE)

( * ) Notice: Subject to any disclaimer, the term of this patent is extended or adjusted under 35 U.S.C. 154(b) by 53 days.

(21) Appl. No.: 14/359,807

(22) PCT Filed: Oct. 22, 2012

(86) PCT No.: PCT/EP2012/070853
§ 371 (c)(1),
(2) Date: May 21, 2014

(87) PCT Pub. No.: WO2013/075897
PCT Pub. Date: May 30, 2013

(65) Prior Publication Data
US 2014/0321177 A1    Oct. 30, 2014

(30) Foreign Application Priority Data
Nov. 24, 2011   (DE) ................. 10 2011 119 259

(51) Int. Cl.
*H02M 7/06* (2006.01)
*H02M 7/10* (2006.01)
(Continued)

(52) U.S. Cl.
CPC ............. *H02M 7/06* (2013.01); *H02M 7/068* (2013.01); *H02M 7/103* (2013.01); *H02J 17/00* (2013.01); *H02M 7/217* (2013.01); *Y02B 70/1441* (2013.01)

(58) Field of Classification Search
CPC ........... H02M 7/10; H02M 7/06; H02M 7/068
(Continued)

(56) References Cited

U.S. PATENT DOCUMENTS 4,315,306 A  *  2/1982  Tol ......................... H04N 3/18
                                                348/E3.034
4,513,361 A  *  4/1985  Rensink ................. H02M 7/10
                                                323/222
(Continued)

FOREIGN PATENT DOCUMENTS

CH             491526       2/1968
CN         101809687 A      8/2010
(Continued)

OTHER PUBLICATIONS

US 4,561,048, 12/1985, Takamura et al. (withdrawn)
(Continued)

*Primary Examiner* — Gary L Laxton
*Assistant Examiner* — Kyle J Moody
(74) *Attorney, Agent, or Firm* — The Webb Law Firm (57) ABSTRACT

A secondary-side rectifier of an inductive n-phase energy transmission system with N greater than or equal to 3, the energy transmission system including in each phase a resonant oscillating circuit, each resonant oscillating circuit including at least one inductor and at least one capacitor wherein secondary-side resonant oscillating circuits are magnetically coupleable to primary-side resonant oscillating circuits, wherein the secondary-side resonant oscillating circuits are star-connected or mesh-connected and are connected to a rectifier via external conductors, wherein the rectifier includes a series connection of a plurality of diodes with identical conducting directions, wherein a smoothing capacitor is connected in parallel with the series connection and an output voltage of the rectifier is applied to connecting
(Continued)

points of the smoothing capacitor wherein each external conductor is connected to an anode of the diodes.

19 Claims, 5 Drawing Sheets

(51) Int. Cl.
  *H02M 7/217* (2006.01)
  *H02J 17/00* (2006.01)

(58) Field of Classification Search
  USPC .............. 363/18, 21.02, 67, 68, 69, 70
  See application file for complete search history.

(56) References Cited

U.S. PATENT DOCUMENTS

| | | | | |
|---|---|---|---|---|
| 4,527,229 | A * | 7/1985 | Imamura | H01F 38/42 315/411 |
| 4,584,637 | A * | 4/1986 | Takamura | H02M 7/10 363/61 |
| 4,651,268 | A | 3/1987 | Takamura et al. | |
| 5,047,912 | A | 9/1991 | Pelly | |
| 5,936,854 | A | 8/1999 | Uesugi et al. | |
| 6,366,058 | B1 | 4/2002 | Honsberg | |
| 7,215,560 | B2 | 5/2007 | Soldano et al. | |
| 8,908,400 | B2 * | 12/2014 | Lisi | H02J 5/005 363/127 |
| 2006/0034109 | A1 | 2/2006 | Benabdelaziz et al. | |
| 2006/0220628 | A1 | 10/2006 | Soldano | |
| 2006/0227577 | A1 | 10/2006 | Horiuchi et al. | |
| 2010/0314947 | A1 | 12/2010 | Baarman et al. | |
| 2011/0198176 | A1 | 8/2011 | Meins et al. | |
| 2011/0291737 | A1 * | 12/2011 | Kshirsagar | H02M 7/217 327/426 |
| 2012/0217111 | A1 | 8/2012 | Boys et al. | |
| 2014/0313801 | A1 * | 10/2014 | Turki | H02M 7/217 363/126 |

FOREIGN PATENT DOCUMENTS

| | | |
|---|---|---|
| CN | 202034861 U | 11/2011 |
| DE | 3338336 A1 | 5/1984 |
| DE | 19754239 A1 | 6/1999 |
| DE | 102007002874 A1 | 7/2008 |
| EP | 1976103 B1 | 8/2013 |
| GB | 1214464 | 12/1970 |
| JP | 60109766 A | 6/1985 |
| JP | 61092172 A | 5/1986 |
| WO | 2011016736 A2 | 2/2011 |

OTHER PUBLICATIONS

Fu et al., "Maximum Efficiency Analysis and Design of Self-resonance Coupling Coils for Wireless Power Transmission System", Proceedings of the CSEE, Jun. 25, 2009, pp. 21-26, vol. 29, No. 18, Chinese Society for Electrical Engineering.

* cited by examiner

Fig. 1

Prior Art

Fig. 2

Prior Art

DOUBLE-RECTIFIER FOR A MULTI-PHASE CONTACTLESS ENERGY TRANSMISSION SYSTEM

CROSS-REFERENCE TO RELATED APPLICATIONS

This application is the United States national phase of International Application No. PCT/EP2012/070853 filed Oct. 22, 2012, and claims priority to German Patent Application No. 10 2011 119 259.3 filed Nov. 24, 2011, the disclosures of which are hereby incorporated in their entirety by reference.

BACKGROUND OF THE INVENTION

Field of the Invention

This disclosure relates generally to a secondary-side rectifier for an energy transmission system.

Description of Related Art

In contactless energy transmission, usually a voltage induced in the secondary circuit of an air-gap transformer is rectified. The resulting direct-current voltage is used to supply power to consumers. For high power requirements, the multi-phase layout of the system is of advantage because power density is increased.

Figure 1:
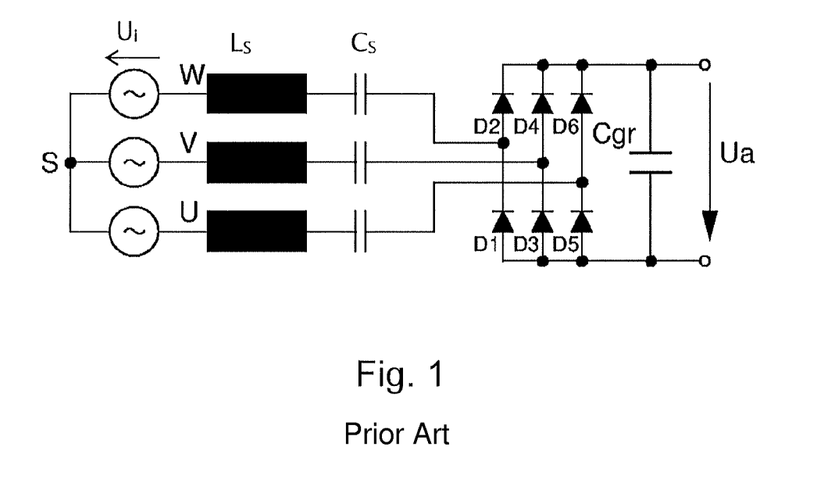
FIG. 1: The secondary side of a three-phase energy transmission system with a downstream full bridge rectifier, with the resonant oscillating circuits being star-connected.

FIG. 1 shows a simple secondary rectifier consisting of a diode full bridge. The secondary side of the energy transmission system shown in FIG. 1 is designed as a three-phase system in which the resonant oscillating circuits that form the three phases consist of the inductors $L_S$ and the resonant capacitors $C_S$ which are star-connected. The substitute voltage sources $U_i$ stand for the voltages $U_i$ induced in the secondary windings. A three-phase system is the most simple multi-phase contactless energy transmission system. However, in principle, this document refers to all possible numbers of phases. Odd numbers are in most cases advantageous.

The full bridge rectifier shown in FIG. 1 generates a direct-current voltage which first and foremost depends on the coupling with the primary circuit and also from the load. Where a constant direct-current voltage is required, the rectifier voltage variable is regulated via a downstream DC/DC converter which is not shown.

Figure 2:
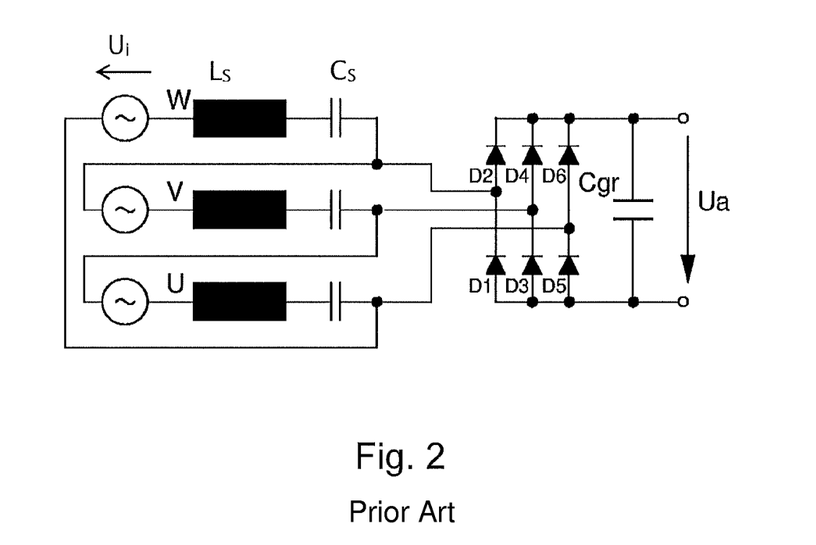
FIG. 2: The secondary side of a three-phase energy transmission system with a downstream full bridge rectifier, with the resonant oscillating circuits being delta-connected.

FIG. 2 shows the secondary side of the energy transmission system with delta-connected phases.

SUMMARY OF THE INVENTION

The objective of this present invention is to provide a rectifier which consists of few electronic components and generates a higher output voltage than a full bridge rectifier does. Another objective of the invention is to develop the secondary-side rectifier according to the invention in such a way that a variable output voltage can be generated.

The invention relates to a secondary-side rectifier of an inductive n-phase energy transmission system with n greater than or equal to 3, the energy transmission system having in each phase a resonant oscillating circuit, each with at least one inductor and at least one capacitor, and the secondary-side resonant oscillating circuits being magnetically coupleable to primary-side resonant oscillating circuits, with the secondary-side resonant oscillating circuits being star-connected or mesh-connected and being connected to a rectifier via external conductors.

For the dimensioning of the series resonant circuits for the secondary part of the contactless energy transmission system, the nominal reactive voltage which usually is greater than the active voltage is determinative of the internal voltages within the device. The higher the inductance factor of a phase, the higher the reactive power which needs to be compensated by the resonant capacitors. The relationship between both the inductance factor and the reactive voltage and the number of turns of the winding is a quadratic one. In contrast, the active voltage relates to the number of turns in a linear way. If we would, at a given output active power, reduce the active voltage of the resonant circuit via the number of turns, the nominal current would increase due to the linear or proportional dependence.

However, since the reactive voltage changes in a quadratic relationship with the number of turns, the reactive power is reduced. The consequence of this is that the capacitance of the capacitors required for compensation can be reduced which would enable drastic savings in terms of volume, weight and costs.

The rectifier according to the invention is advantageously characterised in that only a number of diodes equal to the number of phases and one smoothing capacitor are required. With the same dimensioning of the number of turns and the other components, the output voltage achieved is twice as high compared to a conventional full bridge rectifier. Where the required output voltage is not changed compared to an energy transmission system with full bridge rectifier, the number of turns of the transmission coils can advantageously be reduced. As described above, the reactive power to be compensated is also reduced which is why the capacitance of the capacitors can be reduced. As a result of this, the secondary-side pickups of the energy transmission system can advantageously be designed smaller which in addition to costs also saves weight.

Due to the possibility to connect the secondary-side resonant oscillating circuit phases either in a star or a mesh connection, the output voltage can advantageously be adjusted to the respective conditions. However, usually the star connection is to be preferred. Different output voltages can be achieved with the circuits shown in the table below.

| Topology | Output voltage |
| --- | --- |
| Three-phase rectifier in delta connection according to prior art | $\sqrt{2} * U_i$ |
| Three-phase rectifier in star connection according to prior art | $\sqrt{3}\sqrt{2} U_i$ |
| Three-phase doubler in delta connection according to the invention | $2\sqrt{2} U_i$ |
| Three-phase doubler in star connection according to the invention | $2\sqrt{3}\sqrt{2} U_i$ |

External conductors $L_k$ within the meaning of the invention are the k=1 to N connecting conductors which connect the free ends of the phases of the star connection or the connecting points of the phases of the mesh connection to the secondary-side rectifier. Hence, three external conductors $L_1$, $L_2$ and $L_3$ have to be connected to the rectifier in the case of a three-phase energy transmission system.

The N diodes ($D_1$, $D_k$, . . . , $D_N$) of the rectifier are connected in series with identical conducting directions, so that always the cathode of diode $D_k$ is electrically connected to the anode of diode $D_{K+1}$, with k=1 to N−1. The output-side smoothing capacitor $C_{gr}$ at which the output voltage $U_A$ can be picked up is connected in parallel with the series connection of the N diodes. The external conductors $L_k$, with k=1 to N, are connected to the anode of diode ($D_k$) respectively.

The rectifier circuit according to the invention is of a simple layout and advantageously consists of just a few components. At a given nominal power, advantageously just a small reactive power compensation needs to be made in the secondary resonant circuit, so that the necessary resonant capacitors can be dimensioned smaller. This advantageously reduces the volume and the weight of the secondary side of the energy transmission system. Moreover, a smaller number of rectifier diodes is required which additionally saves costs and weight. The only disadvantage resulting from the circuit according to the invention is the increased need for smoothing in the output circuit. However, compared to the advantages, this minor disadvantage can be accepted.

By means of an additional switching device, which in particular is made up of just one switching element, all external conductors can be short-circuited with each other, so that for a short time no current charges the smoothing capacitor. The resonant oscillating circuits are charged during that time. By removing the short-circuit by opening the switching device or the switching element, the stored energy of the resonant oscillating circuits is used to charge the smoothing capacitor and feed the consumer. Due the free choice of the pulsing of the switching element, the rectifier can be operated as a step-up converter which advantageously enables the setting or adjustment of an output voltage which is arbitrary within limits.

To establish the short-circuit of the external conductors, advantageously just one switch is required in the most simple case which connects the external conductor $L_n$ to the external conductor $L_1$, whereby all external conductors $L_k$ are short-circuited via the diodes $D_1$ to $D_{N-1}$. The electrical switching element may be a transistor, in particular a IGBT, JFET or MOSFET, which with its collector, or drain, is connected to the connecting point $P_N$ or the external conductor $L_N$ and with its emitter, or source, is connected to the connecting point $A_1$, i.e. to ground.

The switching element or the switching device is controlled by means of a control device, the control device controlling the switching device or the switching element in particular by means of a control signal applied to the base, or gate. The required output voltage or the required output current can be set or adjusted by means of the control device.

In the process, the control device switches on or off the switching element or the switching device, in particular by means of freely adjusting on-off control or pulse width modulation (PWM), and in this way adjusts the output voltage.

To generate little switching loss, the control device switches on the switching element or the switching device only while no voltage is applied to the switching element or the switching device itself. By contrast, it is not decisive that the switching element or the switching device is switched off, or the short-circuit between the external conductors is removed, always only while no current flows through the switch or the diodes.

The essential fact is that the switching element is open for at least one period to allow the free-wheeling of the resonant oscillating circuits. The switching period of the switching element may be a multiple of the resonance period of the transmission frequency of the energy transmission system.

Moreover, the rectifier according to the invention advantageously improves the function reliability of the entire system. If one or several diodes of a conventional full bridge rectifier are defective, these diodes usually become low-ohmic which makes the full bridge rectifier a voltage doubler for the respective phase. The output voltage that increases due to this may damage the downstream electrical components such as batteries or electronic circuits. By contrast, if one or several diodes of the rectifier according to the invention become low-ohmic due to a defect or destruction, this has no negative effect on the downstream components as this fault will reduce the output voltage.

The doubler-rectifier controllable according to the invention advantageously has a higher efficiency because there is no DC/DC converter which is otherwise required and the voltage element can advantageously be de-energised. Despite the multi-phase system, just one semiconductor switch is required as switching element. Due to the smaller reactive power to be compensated, the structural size and the weight of the secondary side of the energy transmission system are reduced. In addition, the system is less expensive because it has fewer components and a DC/DC converter is not needed.

As already explained, the secondary-side rectifier according to the invention is suitable for an energy transmission system with more than two phases, in particular with an odd number of phases equal to or greater than three.

The invention equally claims an energy transmission system and a pickup in which a secondary rectifier according to the invention is used.

The secondary-side rectifier according to the invention is explained in more detail below with the help of drawings and circuit diagrams.

DETAILED DESCRIPTION OF THE INVENTION

Figure 3:
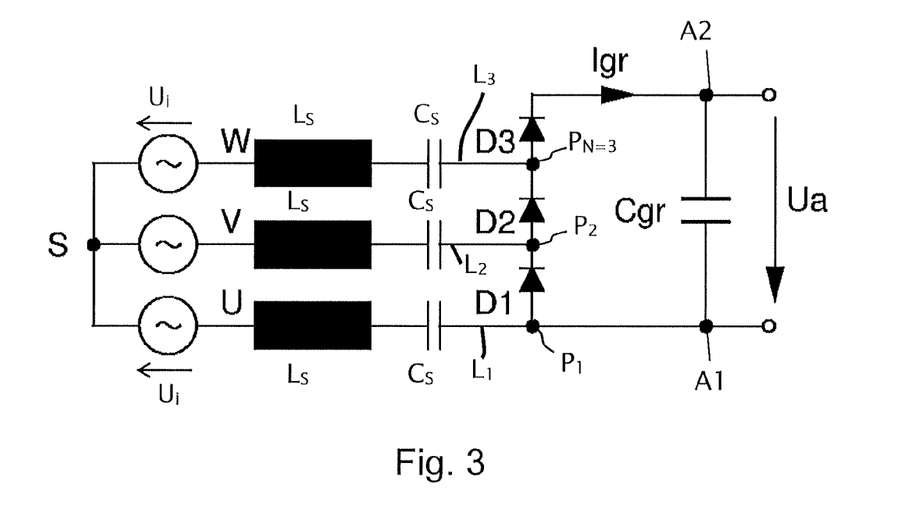
FIG. 3: A secondary-side rectifier according to the invention for a three-phase energy transmission system in which the rectifier functions as a voltage doubler and the resonant oscillating circuits are star-connected.
Figure 4:
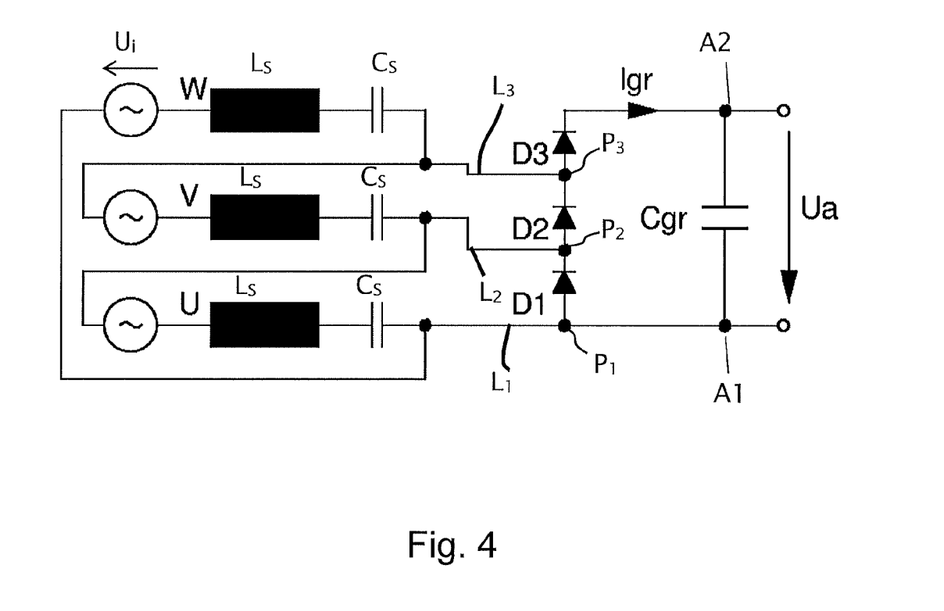
FIG. 4: A secondary-side rectifier according to the invention for a three-phase energy transmission system in which the rectifier functions as a voltage doubler and the resonant oscillating circuits are delta-connected.

Compared to the conventional three-phase full bridge rectifiers shown in FIGS. 1 and 2, the secondary-side rectifier according to the invention, as shown in FIGS. 3 and 4 for the star-connection and the delta-connection of the secondary-side resonant oscillating circuits, requires just half the number of diodes. The connection of the external conductors $L_1$, $L_2$ and $L_3$ to the diodes $D_1$, $D_2$ and $D_3$ is not different for the star-connection and the delta-connection. The effect of the circuit is that the concatenated induced voltages $U_i$ of the secondary circuit of a three-phase system are doubled. For the star-connection in accordance with FIG. 3, this is achieved by means of the diodes D1 and D2. Diode D1 short-circuits the phases U and V during one half period. Diode D2 short-circuits the phases V and W during one half period. The series connection of the diodes D1 and D2 short-circuits the phases U and W during one half period. During the short-circuit via the respective diode(s), the respective resonant capacitor $C_S$ is charged to the peak voltage of the respective phase. In the subsequent other half period, the resonant oscillating circuit runs free on the load circuit with the smoothing capacitor $C_{gr}$ via diode D3 and charges it to the sum of the currently induced voltage and the stored capacitor voltage of the previous half period. Accordingly, the output voltage $U_A$ at the output of the rectifier is twice as high as in a conventional B6-rectifier in accordance with FIGS. 1 and 2.

Figure 5:
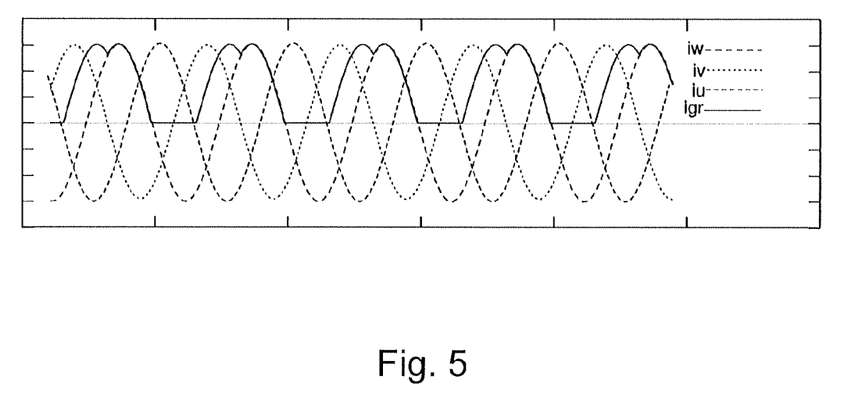
FIG. 5: Current diagram for a circuit in accordance with FIG. 3.

FIG. 5 shows the curves of the individual currents during the phases u, v and w and the curve of the rectifier current $I_{gr}$ in the smoothing capacitor $C_{gr}$ for a circuit in accordance with FIG. 3 or 4. Due to the voltage doubler, the current $I_{gr}$ is interrupted for a period of 120°. Therefore, to achieve sufficient smoothing, it may be necessary to use a smoothing capacitor $C_{gr}$ with a greater capacitance.

Using FIGS. 6 to 10, it is explained how the doubling circuits shown in FIGS. 3 to 5 can be converted by simple means into rectifiers that allow adjustment/regulation of the output voltage.

Figure 6:
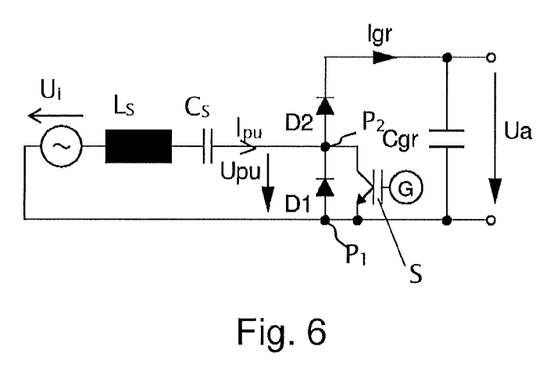
FIG. 6: Equivalent circuit diagram for a single-phase step-up converter.

For a better understanding, a single-phase doubler will firstly be explained using FIG. 6 in which a series resonant circuit $L_S$-$C_S$ can be shorted for a short time via a semiconductor switch S. During the short-circuit, the current of the positive half period flows only in the resonant circuit, charging the resonant circuit. As soon as the semiconductor switch S opens, the resonant circuit $L_S$-$C_S$ discharges to the output capacitor $C_{gr}$ and in this way passes its power to the load. In this way, the switching element S has converted the mere doubler-rectifier into a step-up converter, which is operated in the AC circuit. The switch S may be switched either synchronously with the current $I_{gr}$, so that the switched-on time is the manipulated variable. However, it is also possible to switch only when a current is flowing through the antiparallel diode and hence the switch S is de-energised. In the latter variant, the manipulated variable is the ratio of the switched-on time to the switched-off time. The switched-on time of the switching element S is in most cases a multiple of the period of the transmission frequency of the energy transmission system.

Figure 7:
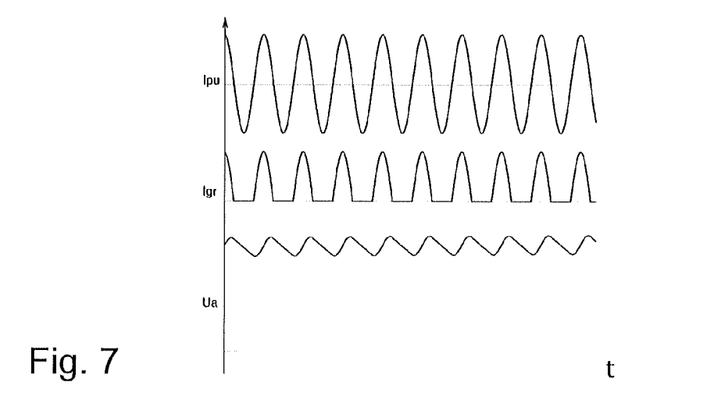
FIG. 7: Current and voltage diagram for a single-phase step-up doubler-rectifier in accordance with FIG. 6.
Figure 8:
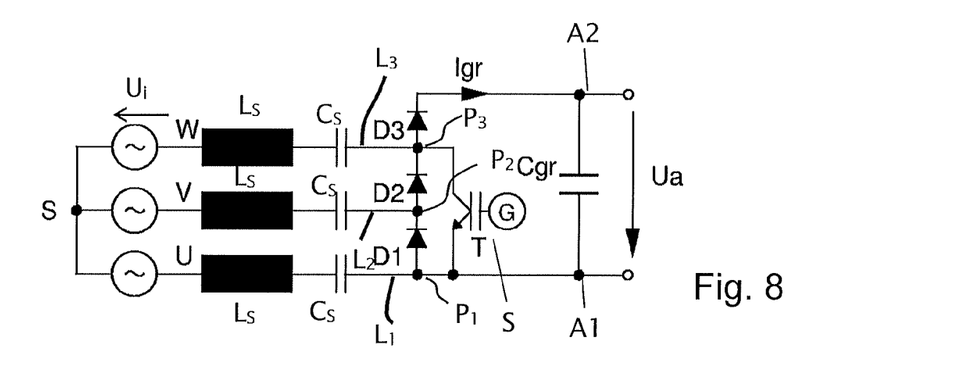
FIG. 8: Three-phase rectifier according to the invention in accordance with FIG. 3 with an additional switching element for stepping up the output voltage.
Figure 9:
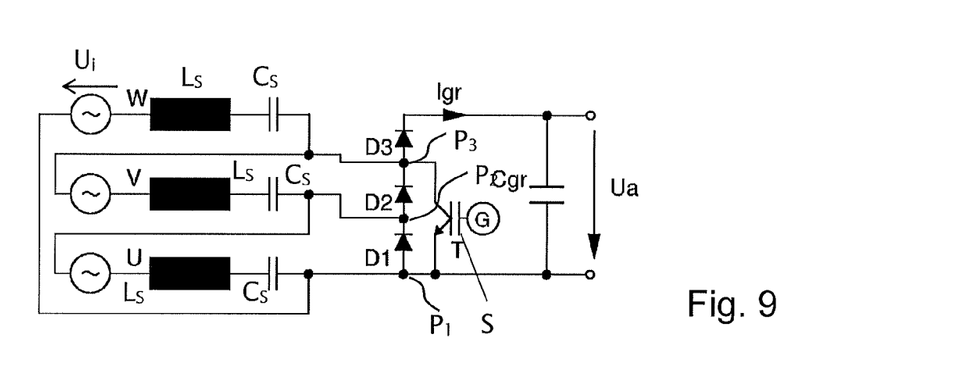
FIG. 9: Rectifier according to the invention in accordance with FIG. 4 with an additional switching element for stepping up the output voltage.

FIG. 7 shows the currents and voltages of the single-phase controllable doubler-rectifier shown and explained in FIG. 6 during the time in which the switching element S is not switched on and hence the resonant oscillating circuit is not short-circuited. As soon as the switching element S is closed, or switched on, the diode D1 is shorted, so that $I_{gr}$ becomes zero, the output voltage starting to drop at the same time. As soon as the switching element S is opened, the charged resonant circuit capacitors $C_S$ are discharged and the current $I_{gr}$ charges the smoothing capacitor. Depending on the duration of the switched-on time and the duration of the switched-off time of the switching element S and in dependence on the value of the load, a certain output voltage $U_A$ is adjusted or, in the case of variable switched-on and switched-off times, regulated.

The switching principle described in FIGS. 6 and 7 can also be applied to a multi-phase energy transmission system. If we adapt the switching principle of the circuit shown in FIG. 6 to a multi-phase system, all phases u, v, w need to be shorted to guarantee the symmetry of the system. The invention achieves this by means of the switching element S shown in FIGS. 8 and 9. The switching element S in the form of a semiconductor switch short-circuits the outermost phases with each other, so that the diodes $D_1$ and $D_2$ located between them also become conductive and contribute to the short-circuit. The same rectifier circuit can be used both for the star and the delta connection of the phases u, v and w.

Figure 10:
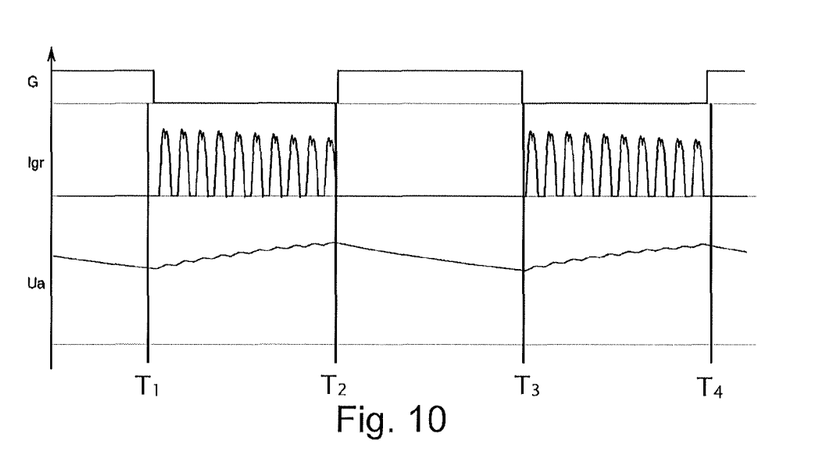
FIG. 10: Current and voltage diagram for a three-phase step-up doubler-rectifier in accordance with FIG. 8 or 9.

The behaviour of the currents and voltages during the switching operation is shown in FIG. 10. While the semiconductor switch S is closed (G=1), no current $I_{gr}$ flows to the output circuit, so that the smoothing capacitor $C_{gr}$ starts discharging via the load which is not shown in the figure. During that time, the energy transmitted by the primary side of the energy transmission system is stored in the resonant circuit. When the switching element S is opened at the time $T_2$ or $T_4$ (G=0), the current $I_{gr}$, in the form of the combination of the stored half periods and the currently induced half period, flows to the load and the smoothing capacitor $C_{gr}$, charging the smoothing capacitor $C_{gr}$ and in this way causing the output voltage $U_A$ to rise. Based on the duty cycle chosen between switched-on and switched-off time, the output voltage $U_A$ can be adjusted upward or stepped up to a certain voltage.

To step the output voltage $U_A$ up to a maximal output voltage $U_{A,max}$, the switching element S is closed for about 95% of a cycle and opened for about 5%. To achieve good smoothing, either the capacitance of the smoothing capacitor Cgr may be increased or at least one additional smoothing stage for smoothing the output voltage $U_A$ may be provided.

Figure 11:
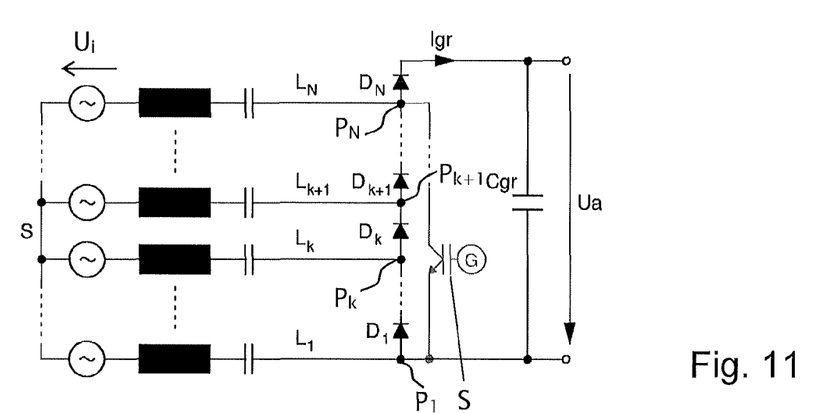
FIG. 11: Rectifier according to the invention with an additional switching element for stepping up the output voltage for an N-phase energy transmission system in which the secondary-side resonant oscillating circuits are star-connected.
Figure 12:
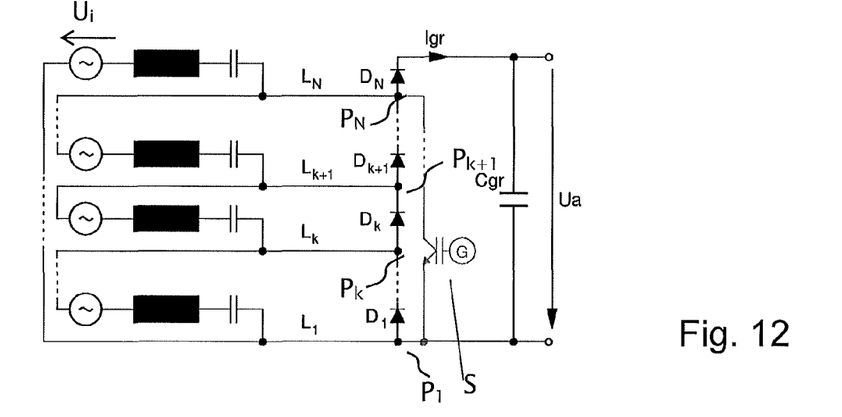
FIG. 12: Rectifier in accordance with FIG. 11 in which the secondary-side resonant oscillating circuits are mesh-connected.

FIGS. 11 and 12 show circuits for an energy transmission system with more than three phases. It can be seen that always just N diodes $D_k$ are required for an N-phase transmission system. Just one switching element S is required for stepping up, irrespective of the number of phases.

The invention claimed is:

1. A secondary-side rectifier of an inductive n-phase energy transmission system with n being an integer greater than or equal to 3, the energy transmission system comprising:

in each phase a resonant oscillating circuit, each resonant oscillating circuit including at least one inductor and at least one capacitor, wherein the resonant oscillating circuits are star-connected or mesh-connected, the rectifier connected to the oscillating circuits via conductors, wherein the rectifier comprises a series connection of a plurality of diodes with identical conducting directions, wherein, with respect to the oscillating circuits, a first diode of the series connection of diodes is directly connected only between a first pair of the oscillating circuits and wherein a second diode of the series connection of diodes is directly connected only between a second, different pair of the oscillating circuits, each conductor being connected to an anode of one of the diodes, a smoothing capacitor, connected in parallel with the series connection of diodes, wherein a first connecting point of the smoothing capacitor is connected via one of the conductors to an anode of the first diode of the series connection of diodes, and a second connecting point of the smoothing capacitor is connected to a cathode of a last diode of the series connection of diodes, and an output voltage of the rectifier is generated at the first connecting point and the second connecting point of the smoothing capacitor.

2. The secondary-side rectifier according to claim 1, wherein two of the conductors are short-circuited with each other by a switching device.

3. The secondary-side rectifier according to claim 2, wherein the switching device connects the first connecting point or one of the conductors to the second connecting point.

4. The secondary-side rectifier according to claim 2, wherein the switching device is a transistor.

5. The secondary-side rectifier according to claim 4, wherein the transistor with an emitter, or a drain, is connected to the first connecting point or one of the conductors and, via a collector or source, is connected to the second connecting point.

6. The secondary-side rectifier according to claim 2, wherein the switching device is controlled via a control signal applied to a base or a gate.

7. The secondary-side rectifier according to claim 6, wherein the output voltage or an output current of the rectifier is adjusted to a desired output voltage or a desired output current via the switching device.

8. The secondary-side rectifier according to claim 7, wherein on or off switching of the switching device is controlled via a freely adjusting on-off control or pulse width modulation, and in this way adjusts the desired output voltage or the desired output current.

9. The secondary-side rectifier according to claim 2, wherein the switching device is switched off, and in this way removes the short-circuit between the conductors, only if no current flows through the switching device or the diodes.

10. The secondary-side rectifier according to claim 2, wherein the switching device is switched on only if no voltage is applied to the switching device.

11. The secondary-side rectifier according to claim 2, wherein the switching device is switched, for adjusting or regulating the output voltage or an output current of the rectifier, with a frequency which is lower than or equal to a transmission frequency of the energy transmission system.

12. The secondary-side rectifier according to claim 11, wherein the switching device is open for at least one period of the transmission frequency to allow free-wheeling of the resonant oscillating circuits.

13. The secondary-side rectifier according to claim 2, wherein the switching device has a switching period that is a multiple of a period of a transmission frequency of the energy transmission system.

14. The secondary-side rectifier according to claim 13, wherein the switching device is open for at least one period of the transmission frequency to allow free-wheeling of the resonant oscillating circuits.

15. The secondary-side rectifier according to claim 2, wherein the switching device is a single electrical switching element.

16. The secondary-side rectifier according to claim 1, wherein the energy transmission system has three, five, seven or 2n+1 phases.

17. A secondary-side pickup for an n-phase energy transmission system with star-connected or mesh-connected resonant oscillating circuits and the secondary-side rectifier according to claim 1.

18. An n-phase energy transmission system with star-connected or mesh-connected resonant oscillating circuits with the secondary-side rectifier according to claim 1.

19. The secondary-side rectifier according to claim 1, wherein a number of diodes of the plurality of diodes equals n.

* * * * *